US010834329B2

(12) United States Patent
Gatt et al.

(10) Patent No.: US 10,834,329 B2
(45) Date of Patent: Nov. 10, 2020

(54) METHOD AND DEVICE FOR BALANCING FOREGROUND-BACKGROUND LUMINOSITY

(71) Applicant: Apple Inc., Cupertino, CA (US)

(72) Inventors: Alexis Gatt, San Jose, CA (US); Todd S. Sachs, Palo Alto, CA (US); Garrett M. Johnson, San Francisco, CA (US); Claus Moelgaard, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/978,122

(22) Filed: May 12, 2018

(65) Prior Publication Data

US 2018/0352241 A1 Dec. 6, 2018

Related U.S. Application Data

(60) Provisional application No. 62/514,544, filed on Jun. 2, 2017.

(51) Int. Cl.
H04N 5/235 (2006.01)
G06T 7/194 (2017.01)
G06T 7/11 (2017.01)
G06T 7/174 (2017.01)

(52) U.S. Cl.
CPC .............. H04N 5/2354 (2013.01); G06T 7/11 (2017.01); G06T 7/174 (2017.01); G06T 7/194 (2017.01); H04N 5/2351 (2013.01); H04N 5/2353 (2013.01); G06T 2207/10152 (2013.01); G06T 2207/20224 (2013.01)

(58) Field of Classification Search
CPC .. H04N 5/2354; H04N 5/2353; H04N 5/2351; G06T 2207/20224; G06T 2207/10152; G06T 7/194; G06T 7/174; G06T 7/11
See application file for complete search history.

(56) References Cited

U.S. PATENT DOCUMENTS

| 7,522,210 | B2 * | 4/2009 | Shimada | H04N 5/2354 348/364 |
| 2008/0193119 | A1 * | 8/2008 | Miyazaki | G03B 7/16 396/157 |
| 2010/0092036 | A1 * | 4/2010 | Das | G06K 9/3241 382/103 |
| 2011/0279699 | A1 * | 11/2011 | Matsui | H04N 5/20 348/222.1 |
| 2016/0277656 | A1 * | 9/2016 | Tsunoda | G06T 11/00 |
| 2017/0300778 | A1 * | 10/2017 | Sato | H04N 5/2226 |

* cited by examiner

Primary Examiner — Nhan T Tran
(74) Attorney, Agent, or Firm — Fernando & Partners, LLP

(57) ABSTRACT

In one embodiment, a method includes: obtaining a first image of a scene while an illumination component is set to an inactive state; obtaining a second image of the scene while the illumination component is set to a pre-flash state; determining one or more illumination control parameters for the illumination component for a third image of the scene that satisfy a foreground-background balance criterion based on a function of the first and second images in order to discriminate foreground data from background data within the scene; and obtaining the third image of the scene while the illumination component is set to an active state in accordance with the one or more illumination control parameters.

20 Claims, 9 Drawing Sheets

Luminosity histogram of ambient JPG image 615

Luminosity histogram of preflash JPG image 625

METHOD AND DEVICE FOR BALANCING FOREGROUND-BACKGROUND LUMINOSITY

RELATED APPLICATION

This application claims priority to U.S. Provisional Patent Application No. 62/514,544, filed on Jun. 2, 2017, entitled "Method and Device for Balancing Foreground-Background Luminosity," the entire contents of which are incorporated herein by reference.

TECHNICAL FIELD

The present disclosure relates generally to image processing, and in particular, to balancing the foreground-background luminosity of flash photography.

BACKGROUND

When an image is captured using flash, the resulting image often includes bothersome by-products, such as hot shadows, red-eye, and over-exposed areas, due to imbalanced foreground-background luminosity. These issues are further exacerbated when using smartphone cameras with constrained flash and/or image sensor components.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

Figure 1:
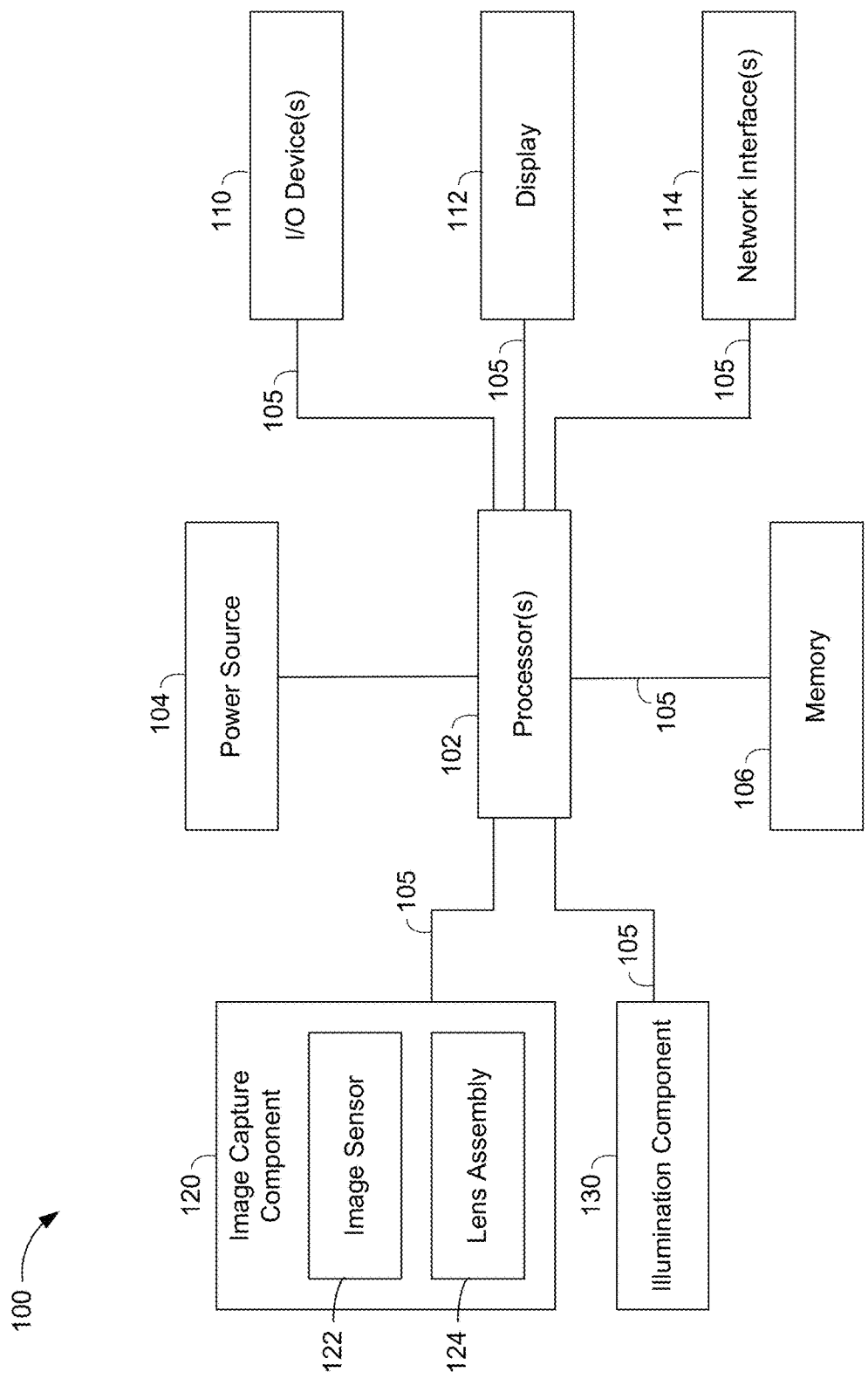
FIG. 1 illustrates a block diagram of an electronic device in accordance with some embodiments.

In accordance with common practice, various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the figures.

DESCRIPTION OF EXAMPLE EMBODIMENTS

FIG. 1 is a block diagram of an electronic device 100 in accordance with some embodiments. While pertinent features are shown, those of ordinary skill in the art will appreciate from the present disclosure that various other features have not been illustrated for the sake of brevity and so as not to obscure more pertinent aspects of the example embodiments disclosed herein. To that end, as a non-limiting example, the electronic device 100 includes: one or more processors 102 (e.g., microprocessors, central processing units (CPUs), graphical processing units (GPUs), application-specific integrated circuits (ASICs), field-programmable gate arrays (FPGAs), and/or the like), a power source 104 (e.g., a capacitance storage device, a battery, and/or circuitry for drawing power from an external alternating current (AC) and/or direct current (DC) source), a bus 105 for interconnecting the elements of the electronic device 100, and non-transitory memory 106. In some embodiments, the non-transitory memory 106 includes random-access memory such as dynamic random-access memory (DRAM), static random-access memory (SRAM), double data rate random-access memory (DDR RAM), and/or other random-access solid-state memory devices. In some embodiments, the non-transitory memory 106 includes non-volatile memory such as one or more magnetic disk storage devices, one or more optical disk storage devices, one or more flash memory devices, and/or one or more other non-volatile solid-state storage devices.

In some embodiments, the electronic device 100 also includes: one or more input/output (I/O) devices 110 (e.g., a touch screen display, a touchpad, a mouse, a keyboard, microphone(s), speaker(s), physical button(s), and/or the like), an optional display 112, and one or more network interfaces 114. In some embodiments, the one or more network interfaces 114 include, for example, interfaces and circuitry for a personal area network (PAN), such as a BLUETOOTH network, for a local area network (LAN), such as an 802.11x Wi-Fi network, and/or for a wide area network (WAN), such as a 4G cellular network.

In some embodiments, the electronic device 100 further includes: an image capture component 120 and an illumination component 130. In some embodiments, the image capture component 120 includes an image sensor 122 and an optional lens assembly 124. In some embodiments, the image capture component 120 also optionally includes a shutter, aperture, and/or the like for capturing image data (sometimes also referred to herein as "images"). For example, the image sensor 122 corresponds to a charge-coupled device (CCD) image sensor. In another example, the image sensor 122 corresponds to a complementary metal-oxide semiconductor (CMOS) image sensor. For example, the illumination component 130 corresponds to a flash, strobe, or other suitable light source such as one or more light emitting diodes (LEDs), one or more xenon bulbs, and/or the like. In some embodiments, the illumination component 130 is separate from the electronic device 100 and is controlled by the electronic device 100 via the one or more network interfaces 114 (e.g., an off-camera flash/strobe).

In some embodiments, the electronic device 100 corresponds to a portable computing device such as a digital camera, a smartphone, a tablet, a laptop computer, a wearable computing device, and/or the like. In some embodiments, the electronic device 100 corresponds to a computing device such as a set-top box (STB), over-the-top (OTT) box, gaming console, desktop computer, kiosk, and/or the like.

The various functional blocks shown in FIG. 1 may include hardware elements (including circuitry), software elements (including computer code stored on a computer-readable medium), or a suitable combination of hardware and software elements. It should further be noted that FIG. 1 is merely one example of a particular implementation and is intended to illustrate non-limiting components that may be present in the electronic device 100.

Figure 2:
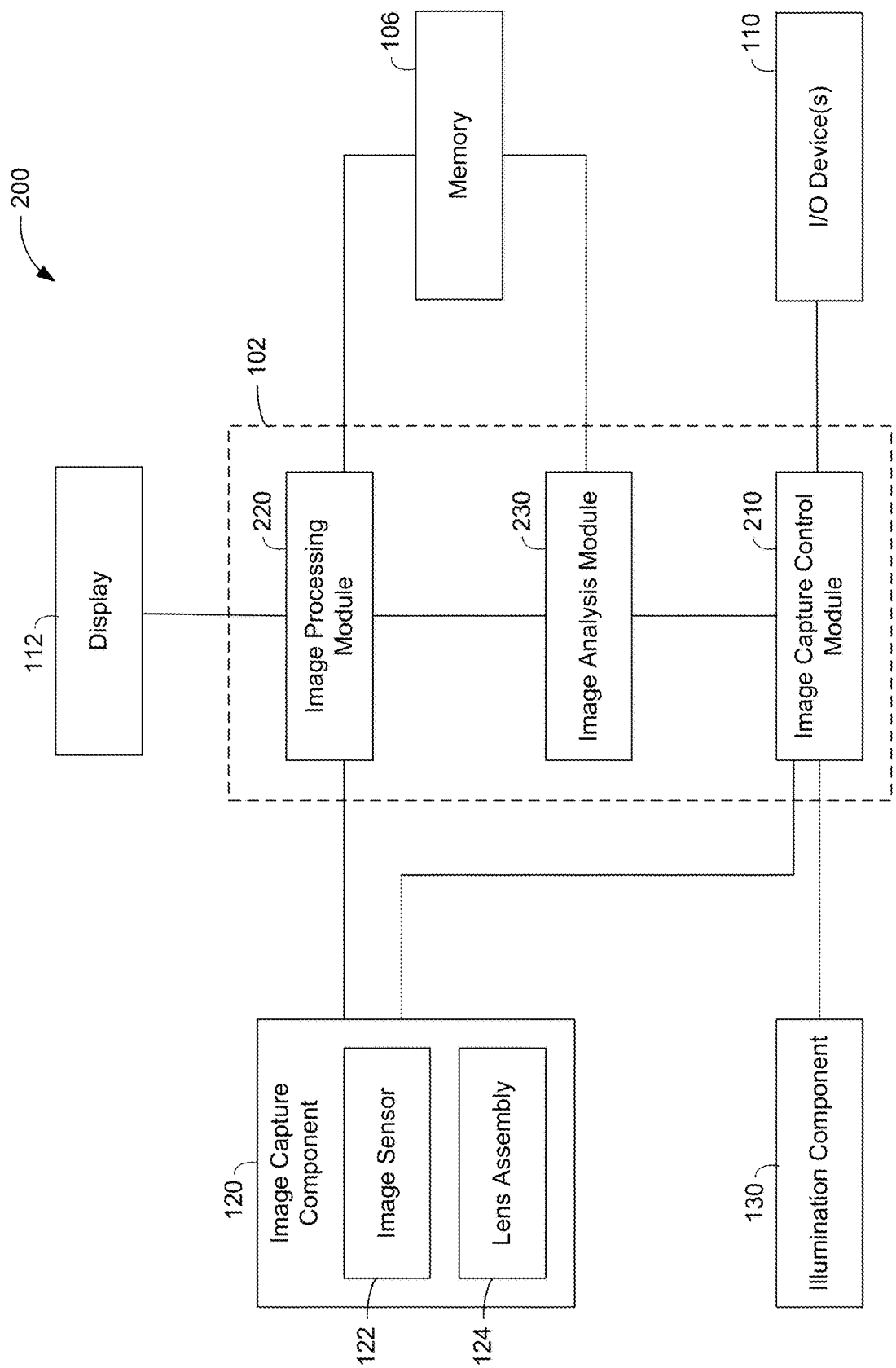
FIG. 2 illustrates a block diagram of an image capture architecture of the electronic device in FIG. 1 in accordance with some embodiments.

FIG. 2 is a block diagram of an image capture architecture 200 of the electronic device 100 in accordance with some embodiments. While pertinent features are shown, those of ordinary skill in the art will appreciate from the present disclosure that various other features have not been illustrated for the sake of brevity and so as not to obscure more pertinent aspects of the example embodiments disclosed herein. For example, in some embodiments, the image capture architecture 200 is similar to and adapted from the electronic device 100 in FIG. 1. As such, FIG. 1 and FIG. 2 include similar elements labeled with the same reference number in both figures have the same function, with only the differences described herein for the sake of brevity.

To that end, as a non-limiting example, the image capture architecture 200 includes an image capture control module 210, an image processing module 220, and an image analysis module 230. According to various embodiments, the modules 210, 220, and 230 may include hardware elements (including circuitry), software elements (including computer code stored on a computer-readable medium), or a suitable combination of hardware and software elements. For example, the modules 210, 220, and 230 correspond to software modules (e.g., programs, computer code, instructions, and/or the like) executed by the one or more processors 102.

In some embodiments, the image capture control module 210 is configured to control the functions of the image capture component 120 and the illumination component 130 based on image analysis data obtained from the image analysis module 230 and/or inputs/requests obtained from the one or more I/O devices 110 (e.g., an image capture input/request). According to some embodiments, the image capture control module 210 instructs the image capture component 120 to capture image data (sometimes also referred to herein as "images") in accordance with one or more image parameters such as specified values for gain, exposure, aperture, shutter speed, ISO, and/or the like. In some embodiments, the image capture control module 210 instructs the image capture component 120 to capture image data according to known auto-focus (AF), auto-exposure (AE), auto-white balance (AWB), and/or optical image stabilization (OSI) algorithms or techniques in the art.

According to some embodiments, the image capture control module 210 instructs the illumination component 130 to function in accordance with one of an active state, a pre-flash state, or an inactive state. In some embodiments, the image capture control module 210 instructs the illumination component 130 to function in the active state based on one or more illumination controls parameters such as duration, timing relative to the image exposure window, intensity, color temperature, directionality, and/or the like.

In some embodiments, the image processing module 220 is configured to obtain raw image data from the image capture component 120 (e.g., from the image sensor 122). In some embodiments, the image processing module 220 is also configured to pre-processes the raw image data to produce pre-processed image data. In various embodiments, the pre-processing includes, for example, converting a RAW image into an RGB or YCbCr image. In various embodiments, the pre-processing further includes gain adjustment, color enhancement, denoising, filtering, and/or the like. In some embodiments, the image processing module 220 is further configured to provide the raw image data and/or the pre-processed image data to the display 112 for rendering thereon. In some embodiments, the image processing module 220 is further configured to provide the raw image data and/or the pre-processed image data to the non-transitory memory 106 for storage therein.

In some embodiments, the image analysis module 230 is configured to obtain the raw image data and/or the pre-processed image data from the image processing module 220 and perform image analysis thereon. In some embodiments, the image analysis module 230 is also configured to determine one or more image parameters and/or one or more illumination control parameters based on the image analysis, which is, in turn, provided to the image capture control module 210. In some embodiments, the image analysis module 230 is further configured to provide the image analysis data to the non-transitory memory 106 for storage therein.

The various functional blocks shown in FIG. 2 may include hardware elements (including circuitry), software elements (including computer code stored on a computer-readable medium), or a suitable combination of hardware and software elements. It should further be noted that FIG. 2 is merely one example of a particular implementation and is intended to illustrate non-limiting components that may be present in the image capture architecture 200.

Figure 4:
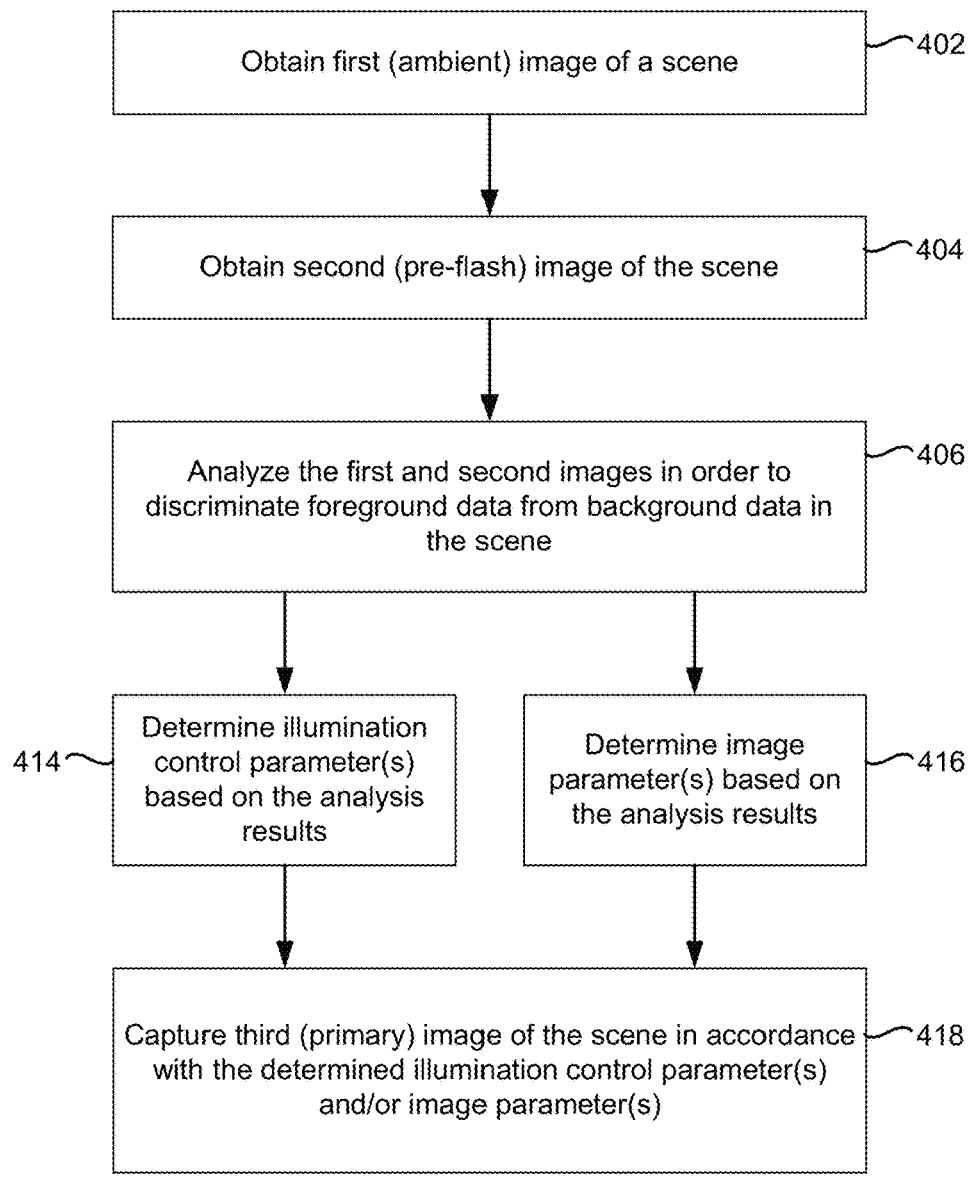
FIG. 4 illustrates a flowchart representation of a method of balancing foreground-background luminosity in accordance with some embodiments.

FIG. 4 is a flowchart representation of a method 400 of capturing an image with balanced foreground-background luminosity in accordance with some embodiments. In some embodiments (and as detailed below as an example), the method 400 is performed by an electronic device (or a portion thereof) such as the electronic device 100 in FIG. 1 or the image capture architecture 200 in FIG. 2, that includes one or more processors, non-transitory memory, an image sensor, and an illumination component. For example, the electronic device includes an image capture architecture with a suitable combination of an image sensor, lens assembly, shutter, aperture, and/or the like. For example, the illumination component corresponds to a flash/strobe including one or more LEDs.

In some embodiments, the method 400 is performed by processing logic, including hardware, firmware, software, or a suitable combination thereof. In some embodiments, the method 400 is performed by one or more processors executing code, programs, or instructions stored in a non-transitory computer-readable storage medium (e.g., a non-transitory memory). Some operations in method 400 are, optionally, combined and/or the order of some operations is, optionally, changed. Briefly, the method 400 includes determining illumination control parameters and/or image parameters based on analysis of a first ambient image and a second pre-flash image in order to capture an image with balanced foreground-background luminosity.

Figure 3:
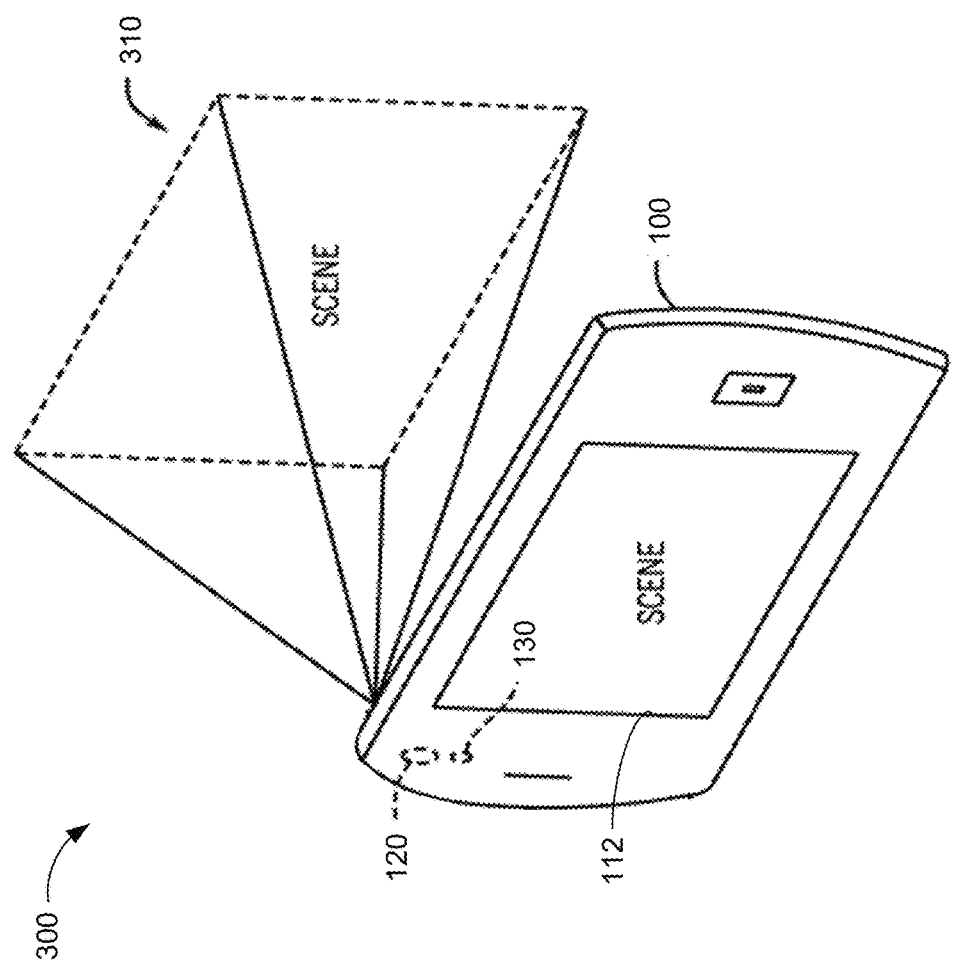
FIG. 3 illustrates an image capture environment in accordance with some embodiments.

The method 400 begins, at block 402, with the electronic device obtaining (e.g., capturing) a first ambient image of a scene. For example, with reference to FIG. 2, while the illumination component 130 is set to the inactive state, the image capture architecture 200 obtains the first image data (e.g., RAW image data) of the scene from the image sensor 122. As one example, FIG. 3 illustrates an image capture environment 300 in accordance with some embodiments. As shown in FIG. 3, the display 112 (e.g., the view finder) of the electronic device 100 shows a preview of the scene 310. For example, the image capture component 120 (e.g., a rear facing camera) of the electronic device 100 captures an image of the scene 310 while the illumination component 130 is set to the inactive state. According to some embodiments, the first ambient image is captured while the image capture architecture 200 operates the image capture component 120 according to known AF, AE, AWB, and/or OSI algorithms or techniques in the art.

The method 400 continues, at block 404, with the electronic device obtaining (e.g., capturing) a second pre-flash image of the scene. For example, with reference to FIG. 2, while the illumination component 130 is set to the pre-flash state (e.g., the flash/strobe is set to a torch or flashlight mode with a predetermined intensity value of Q % such at 75%), the image capture architecture 200 obtains the second image data (e.g., RAW image data) of the scene from the image sensor 122. According to some embodiments, the second pre-flash image is captured while the image capture architecture 200 operates the image capture component 120 according to known AF, AE, AWB, and/or OSI algorithms or techniques in the art.

According to some embodiments, the first ambient image is captured prior to the second pre-flash image. In some embodiments, when the first ambient image is captured prior to the second pre-flash image, one or more subsequent ambient images are captured to provide further iterative data points for the analysis at block 406. According to some embodiments, the first ambient image is captured after the second pre-flash image. In some embodiments, the first ambient image and the second pre-flash image are captured within a predefined time period of one another (e.g., within 100 ns, 100 µs, 1 ms, 10 ms, etc.).

The method 400 continues, at block 406, with the electronic device analyzing the first and second images in order to discriminate foreground data from background data in the scene. In some embodiments, the one or more illumination parameters are set based on the first and second images such that a foreground-background balance criterion is satisfied in order to discriminate foreground data from background data in the scene. For example, with reference to FIG. 2, the image processing module 220 pre-processes the first image data and the second image data. Continuing with this example, with reference to FIG. 2, the image analysis module 230 performs image analysis on the pre-processed first image data and second image data (or a comparison/function thereof) to obtain image analysis data (e.g., the analysis results).

In some embodiments, the analysis of the first and second images corresponds to the difference equation. In some embodiments, the analysis of the first and second images corresponds to a luminance difference. In some embodiments, the analysis of the first and second images corresponds to a relative difference with respect to brightness. In some embodiments, the analysis of the first and second images corresponds to a soft decision.

Figure 6:
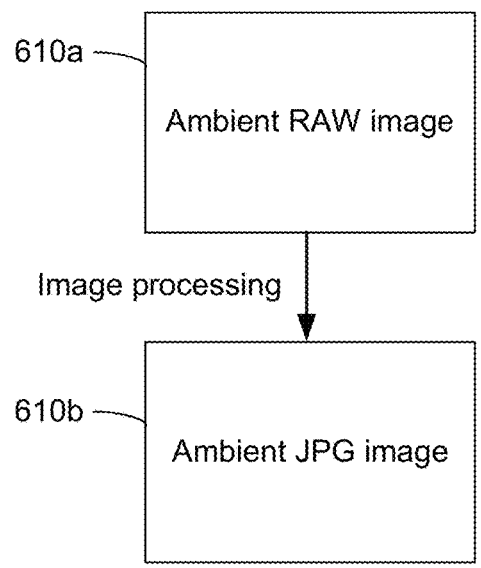
FIG. 6 illustrates image processing and analysis steps of the methods in FIGS. 4-5 in accordance with some embodiments.
Figure 6:
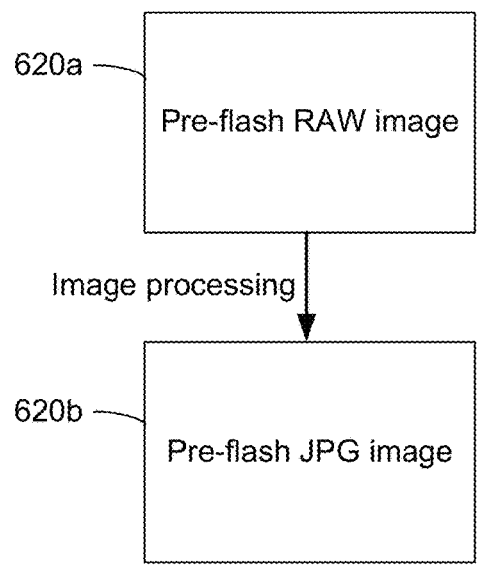
Figure 6:
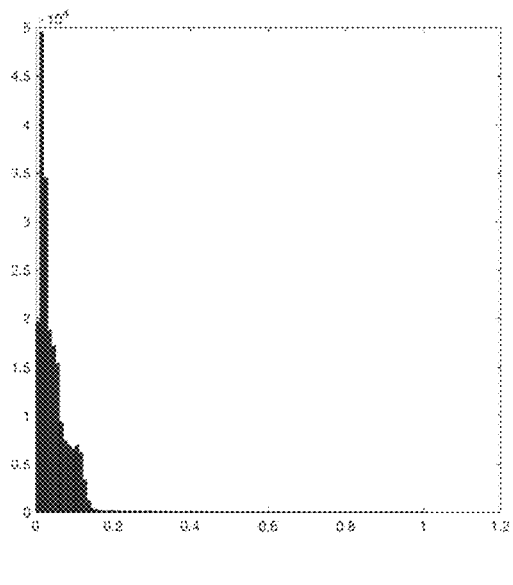
Figure 6:
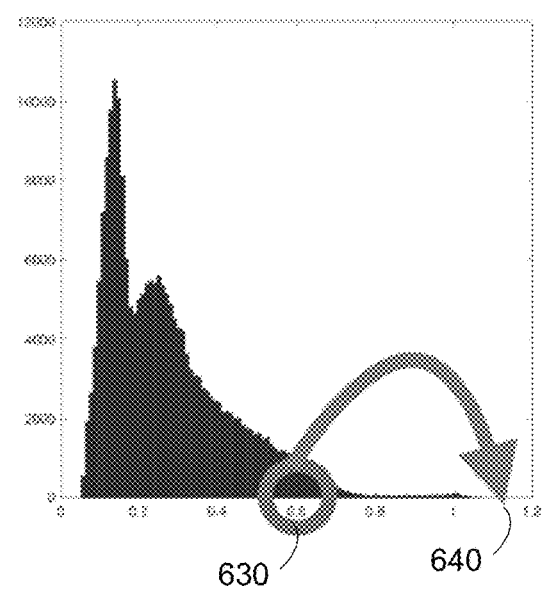

According to some embodiments, with reference to FIG. 2 and FIG. 6, the image processing module 220 obtains an ambient RAW image 610*a* (e.g., the first image captured while the illumination components 130 is set to the inactive state) from the image sensor 122. Continuing with this example, the image processing module 220 performs image processing on the ambient RAW image 610*a* to convert the ambient RAW image 610*a* to an ambient JPG image 610*b* (e.g., the pre-processed first image). Thereafter, the image analysis module 230 performs image analysis on the ambient JPG image 610*b*. For example, with reference to FIG. 2 and FIG. 6, the image analysis module 230 generates a luminosity histogram 615 based on the ambient JPG image 610*b*.

Similarly, according to some embodiments, with reference to FIG. 2 and FIG. 6, the image processing module 220 obtains a pre-flash RAW image 620*a* (e.g., the second image captured while the illumination components 130 is set to the pre-flash state) from the image sensor 122. Continuing with this example, the image processing module 220 performs image processing on the pre-flash RAW image 620*a* to convert the pre-flash RAW image 620*a* to a pre-flash JPG image 620*b* (e.g., the pre-processed second image). Thereafter, the image analysis module 230 performs image analysis on the pre-flash JPG image 620*b*. For example, with reference to FIG. 2 and FIG. 6, the image analysis module 230 generates a luminosity histogram 625 based on the pre-flash JPG image 620*b*.

In some embodiments, the image analysis module 230 generates the luminosity histogram using known algorithms or techniques in the art. According to some embodiments, the luminosity histogram is a statistical representation of pixel luminous levels within the image. For example, the left edge of the luminosity histogram indicates a number of pixels within the image that are pure black. Furthermore, in this example, the right edge of the luminosity histogram indicates a number of pixels that are pure white. In other words, the luminosity histogram indicates the perceived brightness distribution or "luminosity" within the image.

According to some embodiments, with reference to FIG. 2 and FIG. 6, the image analysis module 230 determines an amount of light to add to the scene for a third primary image based on the luminosity histogram 625 in order to balance the foreground-background luminosity. In turn, the image analysis module 230 (or the image capture control module 210) determines one or more illumination control parameters (e.g., the flash duration, intensity, timing relative to the image exposure window, color temperature, directionality, and/or the like) for the third primary image based on the determined amount of light to be added to the scene.

In some embodiments, the image analysis module 230 determines luminance values (c) for the pixels in the ambient RAW image 610*a*. Similarly, in some embodiments, the image analysis module 230 determines luminance values (x) for the pixels (in the pre-flash RAW image 620*a*. Similarly, in some embodiments, the image analysis module 230 determines luminance values (y) for the pixels in the pre-flash JPG image 620*b*. In some embodiments, the image analysis module 230 determines target luminance values (z) for pixels in third primary image to be captured in block 418. In some embodiments, the luminance values (c), (x), and (y) are determined per pixel. In some embodiments, the luminance values (c), (x), and (y) are determined as the average luminance per cell of A×B pixels (e.g., 16×16 pixels).

In some embodiments, the image analysis module 230 determines luminance values (c), (x), and/or (y) for pixels in areas where the pre-flash adds light (e.g., the foreground data). In some embodiments, the image analysis module 230 determines luminance values (c), (x), and/or (y) for pixels within the Nth (e.g., 90th) percentile of the luminosity histogram 625. In some embodiments, the image analysis module 230 determines the target luminance values (z) for pixels within the Nth percentile (e.g., 90th) of the luminosity histogram 625 based on the luminance values (y). For example, the target luminance values (z) correspond to an M % increase (e.g., 25%) in luminance relative to the luminance values (y). For example, with reference to FIG. 6, the value 630 corresponds to N, and the value 640 corresponds to M.

$$f(y)=x+c \qquad (1)$$

$$f(z)=ax+c \qquad (2)$$

As shown by equation (1), the luminance values (y) are a function of the luminance values (x) and (c). Similarly, as shown by equation (2), the target luminance values (z) are a function of the luminance values (x) and (c) and the luminance gain value (a).

$$f(x)=1.25(x)^{0.6} \qquad (3)$$

$$y=1.25(x+c)^{0.6} \qquad (4)$$

$$z=1.25(ax+c)^{0.6} \qquad (5)$$

In some embodiments, the equations (4) and (5) are derived from the predetermined function (3) for f(x). According to some embodiments, the function (3) for f(x) may be changed in various embodiments. In other words, N, M, and f(x) are tunable parameters that are set based on user inputs, machine learning, neural networks, artificial intelligence (AI), and/or the like.

The luminance gain value (a) is solved for based on the equations (4) and (5). According to some embodiments, the luminance gain value (a) corresponds to the amount of light to added to the scene for a third primary image in order to balance the foreground-background luminosity as described above. In some embodiments, the luminance gain value (a) is determined for each of the pixels within the Nth percentile (e.g., 90th) of the luminosity histogram 625.

According to some embodiments, with reference to FIG. 2 and FIG. 6, the image processing module 220, normalizes the ambient JPG image 610b and the pre-flash JPG image 620b based on potential integration time, gain differences, and/or the like. Thereafter, in some embodiments, with reference to FIG. 2, the image analysis module 220 determines local statistics (e.g., average luminance) per cell of A×B pixels (e.g., 16×16 pixels) in the ambient JPG image 610b and the pre-flash JPG image 620b according to a predefined algorithm (e.g., overall mean luminance per cell, overall median luminance per cell, highest luminance value per cell, lowest luminance value per cell, mean luminance of highest N values per cell, median luminance of highest M values per cell, etc.). For example, the image processing module 220 determines a local luminance value for each cell of A×B pixels (e.g., 16×16 pixels) in the ambient JPG image 610b and the pre-flash JPG image 620b.

In some embodiments, with reference to FIG. 2, the image analysis module 220 determines macro statistics (e.g., average luminance) for the ambient JPG image 610b and the pre-flash JPG image 620b based on the aforementioned local statistics according to a predefined algorithm (e.g., overall mean luminance across the local statistics, overall median luminance across the local statistics, highest luminance value across the local statistics, lowest luminance value across the local statistics, mean luminance of highest N values across the local statistics, median luminance of highest M values across the local statistics, etc.). For example, the image processing module 220 determines a macro luminance value for each of the ambient JPG image 610b and the pre-flash JPG image 620b. For example, the image processing module 220 also determines a luminance delta value based on the difference between the macro luminance values for the ambient JPG image 610b and the pre-flash JPG image 620b. In other words, the luminance delta value corresponds to equation (6) below.

$$\text{luminance}_A=\text{macro luminance}_{ambient}-\text{macro luminance}_{pre\text{-}flash} \qquad (6)$$

In some embodiments, with reference to FIG. 2, the image analysis module 220 determines weighted macro statistics (e.g., average luminance) for the ambient JPG image 610b based on the weighted difference of the aforementioned local statistics according to a predefined algorithm (e.g., overall mean luminance across the weighted local statistics, overall median luminance across the weighted local statistics, etc.), where, for example, cells with a greater relative difference between the ambient local statistics and the pre-flash local statistics are weighted greater according to a linear model, logarithmic model, or the like. For example, the image processing module 220 determines a weighted macro luminance value for the ambient JPG image 610b and a macro luminance value for the pre-flash JPG image 620b. For example, the image processing module 220 also determines a weighted luminance delta value based on the difference between the weighted macro luminance value for the ambient JPG image 610b and the macro luminance value for the pre-flash JPG image 620b. In other words, the weighted luminance delta value corresponds to equation (7) below.

$$\text{weighted luminance}_A=\text{weighted macro luminance}_{ambient}-\text{macro luminance}_{pre\text{-}flash} \qquad (7)$$

Thereafter, the following system of equations (8) and (9) is solved to determine one or more illuminance parameters (e.g., flash duration value) and/or one or more one or more image parameters (e.g., exposure period value), or a ratio thereof.

$$\text{target}_A=(\text{weighted macro luminance}_{ambient}*\text{exposure period}*\text{gain})+(\text{weighted luminance}_A*\text{flash duration}*\text{exposure period}*\text{gain}) \qquad (8)$$

$$\text{target}_B=(\text{macro luminance}_{ambient}*\text{exposure period}*\text{gain})+(\text{luminance}_A*\text{flash duration}*\text{exposure period}*\text{gain}) \qquad (9)$$

According to some embodiments, the following tunable parameters are set to achieve predetermined target values A and B—the exposure period value, the gain value and the flash duration value. For example, the target value A corresponds to the luminance associated with the foreground because it takes into account the weighted the difference between the luminance values of the ambient and pre-flash images. Whereas, in this example, the target value B corresponds to the overall luminance (e.g., foreground+background luminance values). In some embodiments, target values A and B are pre-determined values.

When solving the system of equations (8) and (9), the result is a ratio between the exposure period value and flash duration value remains. In some embodiments, this ratio can be set between 0 and 1. According to some embodiments, the gain value is set based on a heuristic, which uses a gain value that reduces noise (e.g., a low gain value).

The method 400 continues, at block 414, with the electronic device determining one or more illumination control parameters based on the analysis results from block 406. For example, with reference to FIG. 2, the image analysis module 230 (or the image capture control module 210) determines the one or more illumination control parameters (e.g., the flash duration, intensity, timing relative to the image exposure window, color temperature, directionality, and/or the like) for the third primary image based on the image analysis data determined in block 406. In another example, with reference to FIG. 2, the image analysis module 230 (or the image capture control module 210) determines the one or more illumination control parameters (e.g., the flash duration, intensity, timing relative to the image exposure window, color temperature, directionality, and/or the like) for the third primary image based on the determined luminance gain values (a).

The method 400 continues, at block 416, with the electronic device determining one or more image parameters based on the analysis results from block 406. For example, with reference to FIG. 2, the image analysis module 230 (or the image capture control module 210) determines the one or more image parameters (e.g., the gain, exposure, shutter speed, aperture, ISO, and/or the like) for the third primary image based on the image analysis data determined in block 406.

As will be appreciated by one of ordinary skill in the art, although the method 400 corresponds to determining the one or more illumination control parameters and the one or more image parameters in parallel in blocks 414 and 416, in other various embodiments, the one or more illumination control parameters and/or the one or more image parameters are determined sequentially.

The method 400 continues, at block 418, with the electronic device obtaining (e.g., capturing) a third primary image of the scene in accordance with the determined one or more illumination control parameters from block 414 and/or the one or more image parameters from block 416. For example, with reference to FIG. 2, while the illumination component 130 is set to the active state in accordance with the one or more illumination control parameters determined in block 414 and the image capture component 120 is set in accordance with the image parameters determined in block 416, the image capture architecture 200 obtains the third primary image data (e.g., RAW image data) of the scene from the image sensor 122. According to some embodiments, the third primary image is captured while the image capture architecture 200 operates the image capture component 120 according to known AF, AE, AWB, and/or OSI algorithms or techniques in the art.

Figure 5:
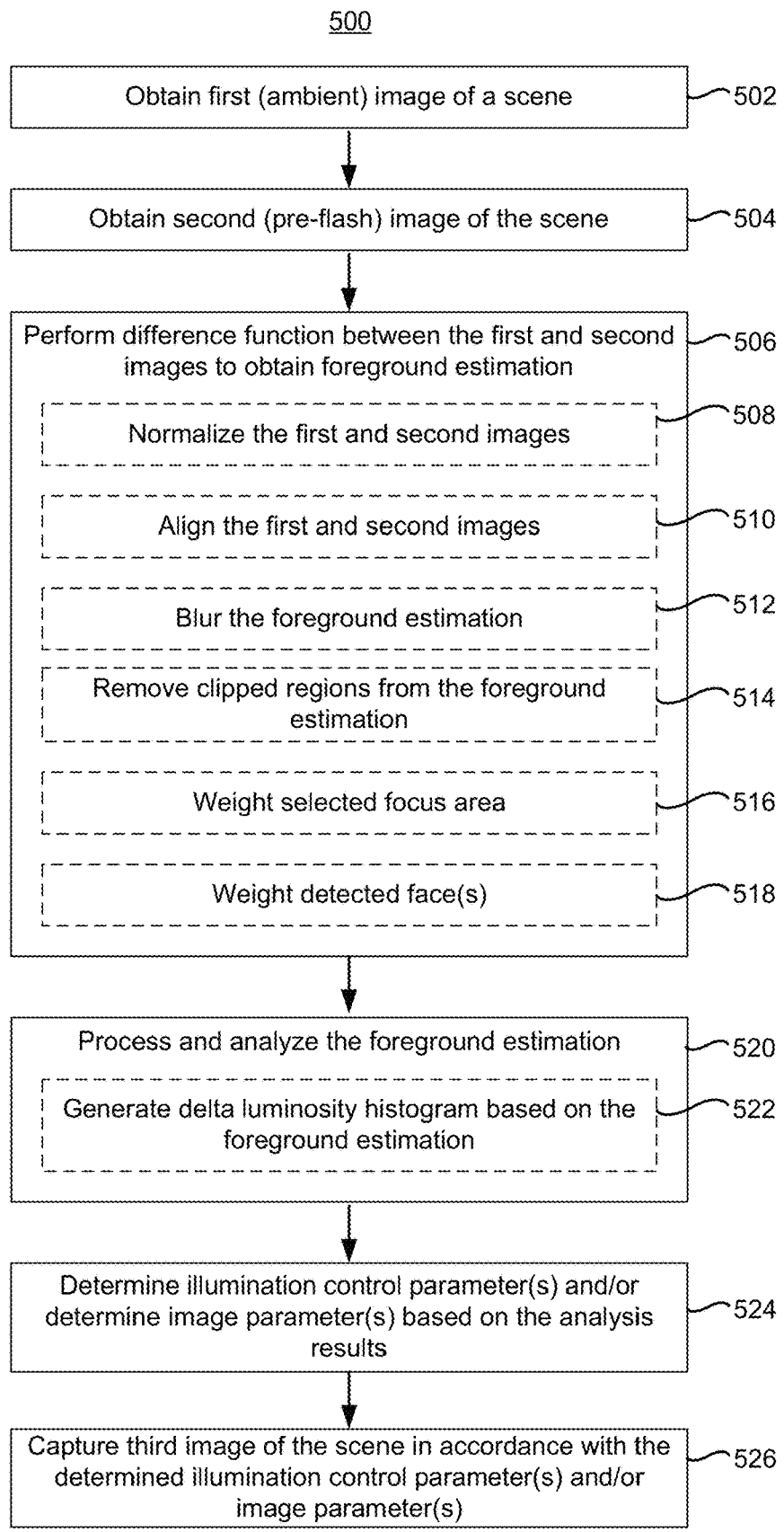
FIG. 5 illustrates a flowchart representation of a method of balancing foreground-background luminosity in accordance with some embodiments.

FIG. 5 is a flowchart representation of a method 500 of capturing an image with balanced foreground-background luminosity in accordance with some embodiments. In some embodiments (and as detailed below as an example), the method 500 is performed by an electronic device (or a portion thereof), such as the electronic device 100 in FIG. 1 or the image capture architecture 200 in FIG. 2, that includes one or more processors, non-transitory memory, an image sensor, and an illumination component. For example, the electronic device includes an image capture architecture with a suitable combination of an image sensor, lens assembly, shutter, aperture, and/or the like. For example, the illumination component corresponds to a flash/strobe including one or more LEDs.

In some embodiments, the method 500 is performed by processing logic, including hardware, firmware, software, or a suitable combination thereof. In some embodiments, the method 500 is performed by one or more processors executing code, programs, or instructions stored in a non-transitory computer-readable storage medium (e.g., a non-transitory memory). Some operations in method 500 are, optionally, combined and/or the order of some operations is, optionally, changed. Briefly, the method 500 includes: determining a foreground estimation based on analysis of a first ambient image and a second pre-flash image; and determining illumination control parameters and/or image parameters based on the foreground estimation in order to capture an image with balanced foreground-background luminosity.

The method 500 begins, at block 502, with the electronic device obtaining (e.g., capturing) a first ambient image of a scene. According to some embodiments, the operations and/or functions of block 502 are similar to and adapted from the operations and/or functions of block 402 in FIG. 4. As such, they will not be discussed again for the sake of brevity.

The method 500 continues, at block 504, with the electronic device obtaining (e.g., capturing) a second pre-flash image of the scene. According to some embodiments, the operations and/or functions of block 504 are similar to and adapted from the operations and/or functions of block 404 in FIG. 4. As such, they will not be discussed again for the sake of brevity.

According to some embodiments, the first ambient image is captured prior to the second pre-flash image. In some embodiments, when the first ambient image is captured prior to the second pre-flash image, one or more subsequent ambient images are captured to provide further iterative data points for the difference function at block 506. According to some embodiments, the first ambient image is captured after the second pre-flash image. In some embodiments, the first ambient image and the second pre-flash image are captured within a predefined time period of one another (e.g., within 100 μs, 1 ms, 10 ms, etc.).

The method 500 continues, at block 506, with the electronic device performing a difference function between the first and second images to obtain a foreground estimation. For example, with reference to FIG. 2, the image processing module 220 pre-processes the first image data and the second image data. Continuing with this example, with reference to FIG. 2, the image analysis module 230 performs image analysis on the pre-processed first image data and second image data (or a comparison/function thereof) to obtain image analysis data (e.g., the analysis results). In some embodiments, the image analysis module 230 performs a difference function between the first and second image data to generate a foreground estimation of the scene.

For example, the foreground estimation is used to discriminate foreground data from background data within the scene in order to satisfy a foreground-background luminosity criterion that balances the foreground-background luminosity. In some embodiments, the foreground estimation corresponds to a difference mask between the first and second images based on relative brightness differences of the constituent pixels. For example, with reference to FIG. 2, the image analysis module 230 subtracts the luminance values of pixels in the second image from the luminance values of pixels in the first image to isolate the foreground and to obtain the foreground estimation. In another example, with reference to FIG. 2, the image analysis module 230 subtracts the luminance values of each cell of A×B pixels in the second image from the luminance values of each cell of A×B pixels in the first image to isolate the foreground and to obtain the foreground estimation.

As such, the comparison/function between the first and second images corresponds to the difference equation. In some embodiments, the comparison/function between the first and second images corresponds to a luminance difference. In some embodiments, the comparison/function between the first and second images corresponds to a relative difference with respect to brightness. In some embodiments, the comparison/function between the first and second images corresponds to a soft decision.

In some embodiments, the first and second images correspond to RAW image data that are converted to pre-processed (e.g., JPG) image data. In some embodiments, prior to performing the difference function between the first and second images, the electronic device or an element thereof (e.g., the image processing module 220 or the image analysis module 230 in FIG. 2): removes clipped regions between the first and second images, blurs the first and second images, and aligns the first and second images. In some embodiments, after performing the difference function between the first and second images, the electronic device or an element thereof (e.g., the image processing module 220 or the image analysis module 230 in FIG. 2) removes clipped regions in the foreground estimation and blurs the foreground estimation.

In some embodiments, the foreground estimation corresponds to a local average for each cell in a grid of A×B pixel cells (e.g., 16×16 pixel cells) when performing the difference equation. This helps to reduce the effects of misalignment of the first and second images resulting from device/camera shake. In some embodiments, the electronic device or an element thereof (e.g., the image processing module 220 or the image analysis module 230 in FIG. 2) generates a luminosity histogram based on the difference between the first and second images in order to determine how much light was added by the pre-flash.

Figure 7:
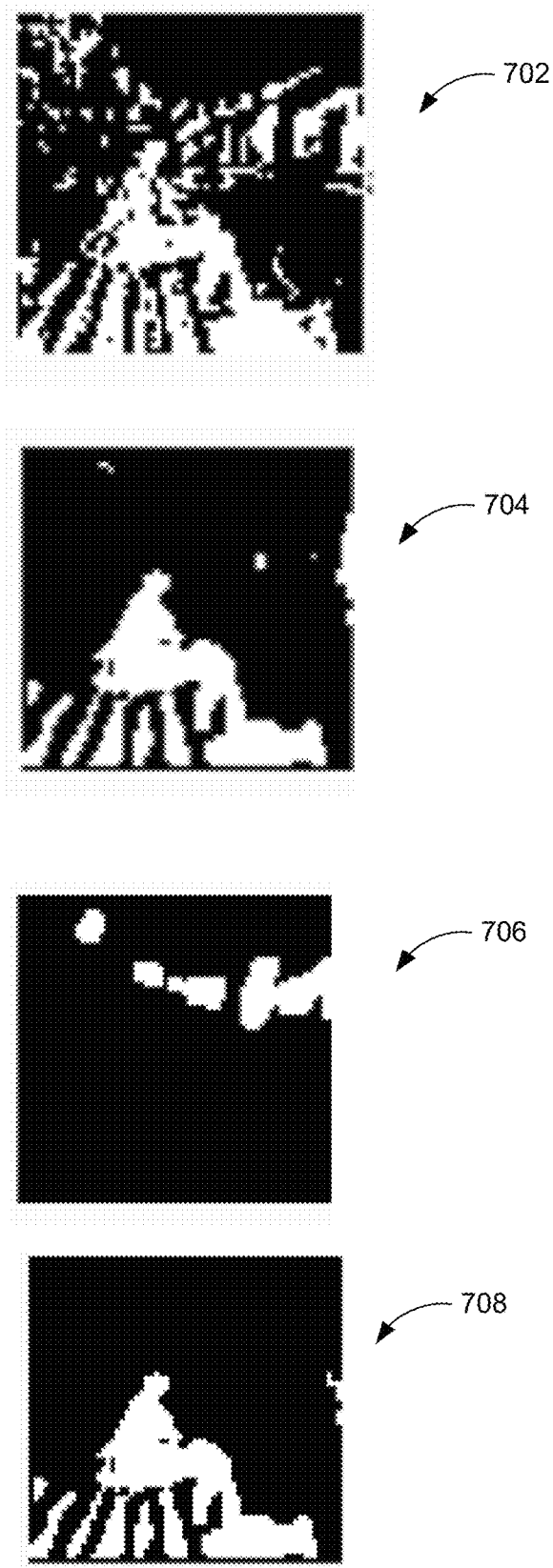
FIG. 7 illustrates images associated with the image processing and analysis steps of the methods in FIGS. 4-5 in accordance with some embodiments.

As one example, in FIG. 7, the image 702 shows an unprocessed foreground estimation between the first ambient image and the second pre-flash image. In this example, the foreground subject has been isolated but background noise associated with ambient light sources remains.

In some embodiments, with reference to block 508, the electronic device normalizes the first and second images. In some embodiments, prior to generating the foreground estimation, the electronic device or an element thereof (e.g., the image processing module 220 or the image analysis module 230 in FIG. 2) normalizes the first and second images based on the settings of the image capture component 120 such as shutter speed, aperture, ISO, and/or the like. In some embodiments, the first and second images are normalized before performing the difference function between the two images. For example, with reference to FIG. 2, the image analysis module 230 normalizes the first and second images based on the image parameters and/or settings of the image capture component 120 at the time of capturing the first and second images.

In some embodiments, with reference to block 510, the electronic device aligns the first and second images. In some embodiments, alignment of the background is important in order to generate an accurate foreground estimation. In some embodiments, the first and second images are aligned before performing the difference function between the two images. For example, with reference to FIG. 2, the image analysis module 230 aligns the first and second images according to known algorithms or techniques (e.g., an alignment technique similar to that for aligning frames of a panorama image).

In some embodiments, with reference to block 512, the electronic device blurs the foreground estimation. In some embodiments, the first and second images are blurred based on a predefined blurring scheme or technique before performing the difference function between the two images. In some embodiments, the blurring is performed to reduce errors from device/camera shake. For example, with reference to FIG. 2, the image analysis module 230 blurs the foreground estimation according to known algorithms or techniques. In some embodiments, the blurring is performed based on the predefined blurring scheme or technique after performing the difference function between the first and second images.

As one example, in FIG. 7, the image 704 shows a blurred foreground estimation between the first ambient image and the second pre-flash image. In this example, the foreground subject has been further isolated but spurious background noise associated with the ambient light sources still remains.

In some embodiments, with reference to block 514, the electronic device removes clipped regions from the foreground estimation. In some embodiments, in order to reduce errors from misalignment due to device/camera shake, a portion of the first image that is not also in the second image (or vice versa) is removed from the foreground estimation. In some embodiments, the clipped regions are removed before performing the difference function between the first and second images. For example, with reference to FIG. 2, the image analysis module 230 identifies clipped regions between the first and second regions and removes the clipped regions from the foreground estimation. In some embodiments, the clipped regions are removed after performing the difference function between the first and second images.

For example, misaligned light sources may introduce false positives when isolating foreground data. As such, the electronic device or an element thereof (e.g., the image processing module 220 or the image analysis module 230 in FIG. 2) isolates the clipped/misaligned regions and obtains a map of those regions that are clipped in both images. In some embodiments, the contrast of the clipped regions is stretched and binarized by applying a sigmoid. In some embodiments, the first and second images are multiplied so that only the regions that are clipped in both remain. In some embodiments, the regions are dilated to have extra margins and then removed from the foreground estimation.

As one example, in FIG. 7, the image 706 shows clipped regions between the first ambient image and the second pre-flash image. As one example, in FIG. 7, the image 708 shows a blurred foreground estimation between a first ambient image and a second pre-flash image with the clipped regions from the image 706 removed. In this example, the foreground subject has been further isolated and the background noise associated with the ambient light sources is further reduced.

In some embodiments, with reference to block 516, the electronic device increases the weight associated with a selected focus region within the foreground estimation. For example, the electronic device or an element thereof (e.g., the one or more I/O devices 110 in FIGS. 1-2) detects an input (e.g., a tap-to-focus gesture on the touch screen display) that corresponds to selecting a focus area within the image preview, and the selected focus area is weighted as the foreground data. For example, with reference to FIG. 2, the image analysis module 230 obtains an indication of a selected focus region and weights the pixels associated with the selected focus region greater than other pixels when performing the image analysis.

In some embodiments, with reference to block 518, the electronic device increases the weight associated with one or more detected faces within the foreground estimation. For example, the electronic device or an element thereof (e.g., the image processing module 220 or the image analysis module 230 in FIG. 2) detects one or more faces within the first and/or second images, and the detected faces are weighted as the foreground data. In some embodiments, if two or more faces are detected, electronic device or an element thereof (e.g., the image processing module 220 or the image analysis module 230 in FIG. 2) gives the largest face (e.g., in pixel area) the most weight (e.g., this assumes that the largest face is closest to the electronic device). For example, with reference to FIG. 2, the image analysis module 230 obtains an indication of one or more detected faces (e.g., from the image analysis module 220) and weights the pixels associated with the detected faces greater than other pixels when performing the image analysis.

In some embodiments, the electronic device performs the operations corresponding to blocks 512, 514, 516, and 518 sequentially according to the order shown in FIG. 5. In some embodiments, the electronic device performs the operations corresponding to blocks 512, 514, 516, and 518 sequentially according to an order different from the order shown in FIG. 5. In some embodiments, the electronic device performs the operations corresponding to blocks 512, 514, 516, and 518 in parallel.

The method 500 continues, at block 520, with the electronic device processing and analyzing the foreground estimation from block 506. In some embodiments, the image analysis module 230 processes and analyzes the foreground estimation generated in block 506. In some embodiments, the image analysis module 230 generates a delta luminosity histogram based on the foreground estimation. In some embodiments, the image analysis module 230 (or the image capture control module 210) determines one or more illumination control parameters for the third primary image based on the delta luminosity histogram. In some embodiments, the image analysis module 230 (or the image capture control module 210) determines one or more illumination control parameters and/or one or more image parameters based on the image analysis data (e.g., the analysis results).

In some embodiments, with reference to block 522, the electronic device generates a delta luminosity histogram based on the foreground estimation from block 506. According to some embodiments, the image analysis module 230 generates the delta luminosity histogram based on the luminance values of the pixels in the foreground estimation (e.g., a foreground mask generated by performing the difference function between the first and second images in block 506).

For example, the image analysis module 230 generates the delta luminosity histogram for the foreground estimation similar to the luminosity histogram 625 described above with reference to block 406. In some embodiments, the image analysis module 230 determines: luminance values (y) for the pixels in the foreground estimation, luminance values (c) for the pixels in the first ambient image, and luminance values (x) for the pixels in the second pre-flash image. In some embodiments, the image analysis module 230 determines the luminance values (c), (x), and/or (y) for pixels within the Nth (e.g., 90th) percentile of the delta luminosity histogram. In some embodiments, the image analysis module 230 determines the target luminance values (z) for pixels within the Nth percentile (e.g., 90th) of the delta luminosity histogram based on the luminance values (y). For example, the target luminance values (z) correspond to an M % increase (e.g., 25%) in luminance relative to the luminance values (y).

As shown by equation (1) above, the luminance values (y) are a function of the luminance values (x) and (c). Similarly, as shown by equation (2) above, the target luminance values (z) are a function of the luminance values (x) and (c) and the luminance gain value (a). The luminance gain value (a) is solved for based on the equations (4) and (5) above. According to some embodiments, the luminance gain value (a) corresponds to the amount of light to added to the scene for a third primary image in order to balance the foreground-background. In some embodiments, the luminance gain value (a) is determined for each of the pixels within the Nth percentile (e.g., 90th) of the delta luminosity histogram.

The method 500 continues, at block 524, with the electronic device determining one or more illumination control parameters and/or one or more image parameters based on the analysis results from block 520. For example, the illumination control parameters correspond to the flash timing relative to the image exposure window such as rear-curtain synchronization, the flash duration, the flash intensity, the color temperature of flash LEDs, the directionality of flash LEDs, and/or the like. For example, the image parameters correspond to gain, exposure, shutter speed, aperture, ISO, and/or the like.

For example, if the delta luminosity histogram generated in block 522 indicates that the foreground is close to the electronic device, the flash duration is short. In another example, if delta luminosity histogram generated in block 522 indicates that the foreground is farther from the electronic device, the flash duration is longer. In some embodiments, the one or more illumination control parameters are selected such that a luminosity histogram of the third primary image would be stretched relative to the delta luminosity histogram such that the third primary image has a more Gaussian luminous distribution.

For example, with reference to FIG. 2, the image analysis module 230 (or the image capture control module 210) determines the one or more illumination control parameters (e.g., the flash duration, intensity, timing relative to the image exposure window, color temperature, directionality, and/or the like) for the third primary image based on the image analysis data determined in block 520. In another example, with reference to FIG. 2, the image analysis module 230 (or the image capture control module 210) determines the one or more illumination control parameters (e.g., the flash duration, intensity, timing relative to the image exposure window, color temperature, directionality, and/or the like) for the third primary image based on the determined luminance gain values (a) from the delta luminosity histogram. For example, with reference to FIG. 2, the image analysis module 230 (or the image capture control module 210) determines the one or more image parameters (e.g., the gain, exposure, shutter speed, aperture, ISO, and/or the like) for the third primary image based on the image analysis data determined in block 520.

As will be appreciated by one of ordinary skill in the art, although the method 500 corresponds to concurrently determining the one or more illumination control parameters and/or the one or more image parameters in block 524, in other various embodiments, the one or more illumination control parameters and/or the one or more image parameters are determined sequentially.

The method 500 continues, at block 526, with the electronic device obtaining (e.g., capturing) a third primary image of the scene in accordance with the determined one or more illumination control parameters from block 524 and/or the one or more image parameters from block 524. For example, with reference to FIG. 2, while the illumination component 130 is set to the active state in accordance with the one or more illumination control parameters determined in block 524 and the image capture component 120 is set in accordance with the image parameters determined in block 524, the image capture architecture 200 obtains the third primary image data (e.g., RAW image data) of the scene from the image sensor 122. According to some embodiments, the third primary image is captured while the image capture architecture 200 operates the image capture component 120 according to known AF, AE, AWB, and/or OSI algorithms or techniques in the art.

Figure 8:
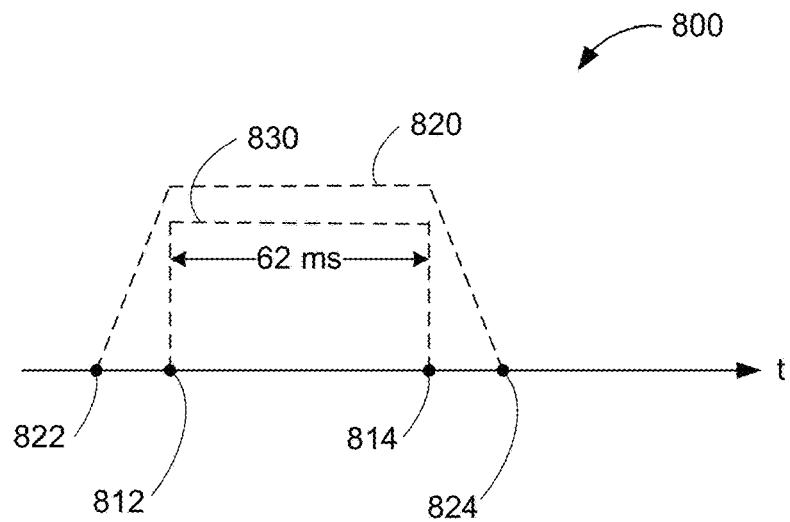
FIG. 8 illustrates example graphical representations of a flash duration relative to an image exposure window in accordance with some embodiments.
Figure 8:
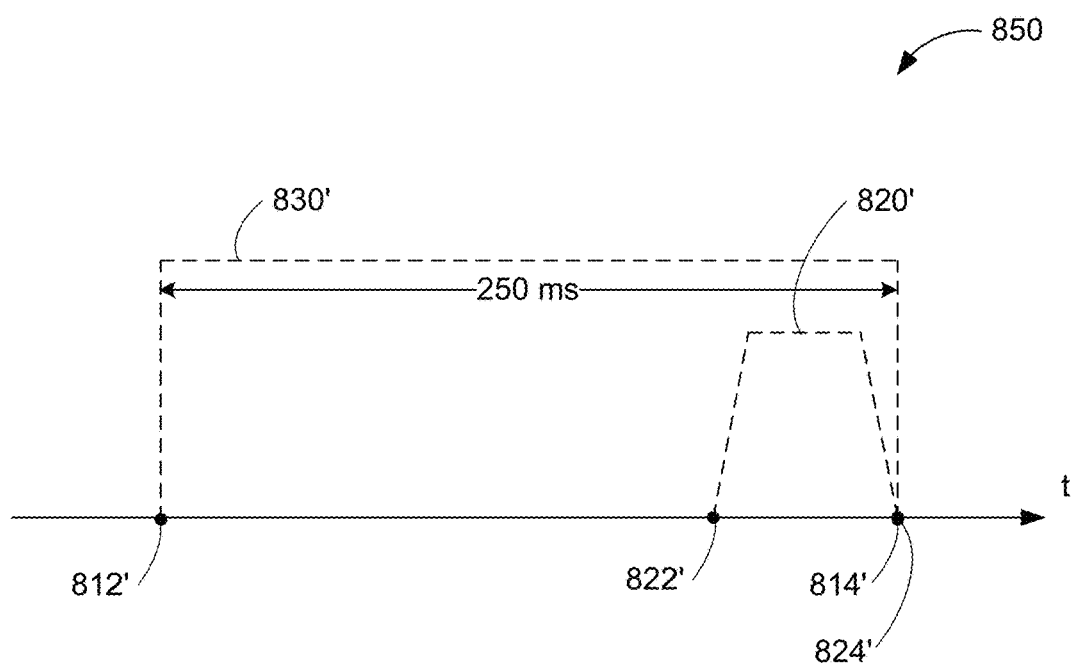

With reference to FIG. 8, the first image capture scenario 800 illustrates a first flash period 820 starting at time 822 and ending at time 824 and a first image exposure window 830 (e.g., 62 ms) starting at time 812 and ending at time 814. As shown in FIG. 8, the first image capture scenario 800 includes a front-curtain flash because the time 822 (e.g., the start of the first flash period 820) occurs before the time 812 (e.g., the start of the first image exposure period 830). As shown in FIG. 8, the first image capture scenario 800 also includes a rear-curtain because the time 824 (e.g., the end of the first flash period 820) occurs after the time 814 (e.g., the end of the first image exposure period 830). According to some embodiments, the electronic device or an element thereof (e.g., the image capture component 120 in FIGS. 1-2) captures the third primary image according to the image exposure window, flash timing relative to the image capture window, and the flash period duration in the first image capture scenario 800 when blocks 502-524 are not performed.

With continued reference to FIG. 8, the second image capture scenario 850 illustrates a second flash period 820' starting at time 822' and ending at time 824' and a second image exposure window 830' (e.g., 250 ms) starting at time 812' and ending at time 814'. As shown in FIG. 8, in the second image capture scenario 850, the second flash period 820' is synchronized to the end of the second image exposure window 830'. According to some embodiments, this enables a motion freeze effect as well as a motion trail for moving objects in the third primary image.

In some embodiments, the electronic device or an element thereof (e.g., the image analysis module 230 or the image capture control module 210 in FIG. 2) synchronizes the flash period to the end of the image exposure capture window as shown in the second image capture scenario 850. In some embodiments, the image exposure capture window is a predefined (e.g., static) time duration. In some embodiments, the electronic device or an element thereof (e.g., the image analysis module 230 or the image capture control module 210 in FIG. 2) dynamically determines the image exposure capture window based on the determined image parameters in block 524. According to some embodiments, the electronic device or an element thereof (e.g., the image capture component 120 in FIGS. 1-2) captures the third primary image according to the image exposure window, flash timing relative to the image capture window, and the flash period duration in the second image capture scenario 850 based on the determined one or more illumination control parameters and/or image parameters from block 524.

Figure 9:
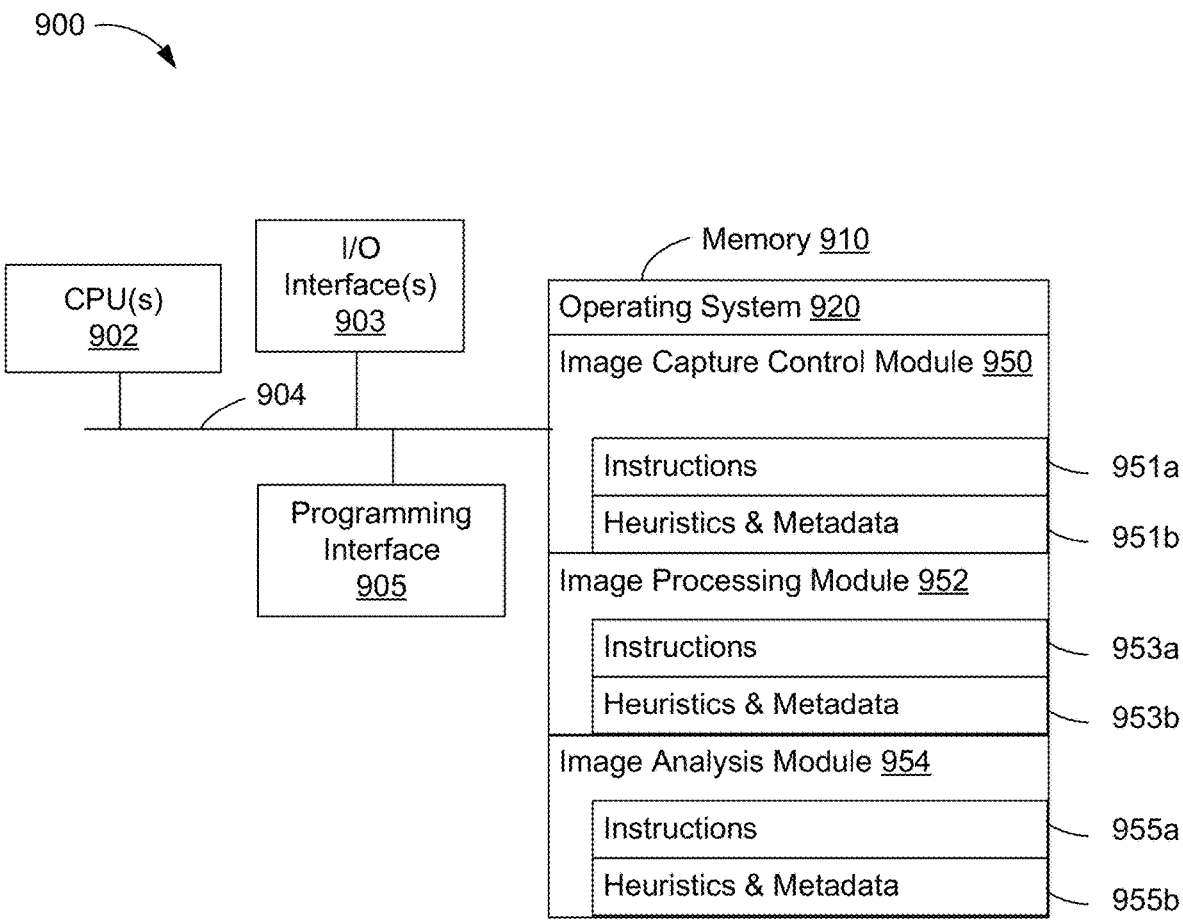
FIG. 9 is a block diagram of a computing device in accordance with some embodiments.

FIG. 9 is a block diagram of a computing device 900 in accordance with some embodiments. In some embodiments, the computing device 900 corresponds to the at least a portion of the electronic device 100 in FIG. 1 and performs one or more of the functionalities described above with respect to the electronic device. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 900 includes one or more processing units (CPUs) 902 (e.g., processors), one or more input/output (I/O) interfaces 903 (e.g., network interfaces, input devices, output devices, and/or sensor interfaces), a memory 910, a programming interface 905, and one or more communication buses 904 for interconnecting these and various other components.

In some embodiments, the communication buses 904 include circuitry that interconnects and controls communications between system components. The memory 910 includes high-speed random-access memory, such as DRAM, SRAM, DDR RAM or other random-access solid-state memory devices; and, in some embodiments, include non-volatile memory, such as one or more magnetic disk storage devices, optical disk storage devices, flash memory devices, or other non-volatile solid state storage devices. The memory 910 optionally includes one or more storage devices remotely located from the CPU(s) 902. The memory 910 comprises a non-transitory computer readable storage medium. Moreover, in some embodiments, the memory 910 or the non-transitory computer readable storage medium of the memory 910 stores the following programs, modules and data structures, or a subset thereof including an optional operating system 920, an image capture control module 950, an image processing module 952, and an image analysis module 954. In some embodiments, one or more instructions are included in a combination of logic and non-transitory memory. The operating system 920 includes procedures for handling various basic system services and for performing hardware dependent tasks.

In some embodiments, the image capture control module 950 is configured to control the functionality of a camera (e.g., the image capture component 120 in FIGS. 1-2) and a flash/strobe (e.g., the illumination component 130 in FIGS. 1-2). To that end, the image capture control module 950 includes a set of instructions 951a and heuristics and metadata 951b.

In some embodiments, the image processing module 952 is configured to pre-process raw image data from an image sensor (e.g., the image sensor 122 in FIGS. 1-2). To that end, the image processing module 952 includes a set of instructions 953a and heuristics and metadata 953b.

In some embodiments, the image analysis module 954 is configured to perform analysis on the image data. In some embodiments, the image analysis module 954 is also configured to determine one or more image parameters and/or one or more illumination control parameters based on the image analysis results. To that end, the image analysis module 954 includes a set of instructions 955a and heuristics and metadata 955b.

Although the image capture control module 950, the image processing module 952, and the image analysis module 954 are illustrated as residing on a single computing device 900, it should be understood that in other embodiments, any combination of the image capture control module 950, the image processing module 952, and the image analysis module 954 can reside in separate computing devices in various embodiments. For example, in some embodiments each of the image capture control module 950, the image processing module 952, and the image analysis module 954 reside on a separate computing device or in the cloud.

Moreover, FIG. 9 is intended more as a functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 9 could be implemented in a single module and the various functions of single functional blocks could be implemented by one or more functional blocks in various embodiments.

The actual number of modules and the division of particular functions and how features are allocated among them will vary from one embodiment to another, and may depend in part on the particular combination of hardware, software and/or firmware chosen for a particular embodiment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs or GP-GPUs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

The disclosure is not intended to be limited to the embodiments shown herein. Various modifications to the embodiments described in this disclosure may be readily apparent to those skilled in the art, and the generic principles defined herein may be applied to other embodiments without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
   at a device with one or more processors, non-transitory memory, an image sensor, and an illumination component:
   obtaining, by the image sensor, a first image of a scene while the illumination component is set to an inactive state;
   obtaining, by the image sensor, a second image of the scene while the illumination component is set to a pre-flash state;
   generating a foreground estimation of the scene based on relative brightness differences of pixels of the first image and pixels of the second image;
   generating a delta luminosity histogram based on the foreground estimation;
   determining one or more illumination control parameters for the illumination component for a third image of the scene that satisfy a foreground-background balance criterion based on the delta luminosity histogram; and
   obtaining, by the image sensor, the third image of the scene while the illumination component is set to an active state in accordance with the one or more illumination control parameters.

2. The method of claim 1, wherein the one or more illumination control parameters set a flash period of the illumination component for the third image relative to a predefined exposure period of the third image.

3. The method of claim 1, further comprising, determining one or more image parameters for the image sensor for the third image based on the foreground estimation in order to discriminate the foreground data from the background data within the scene, wherein one of the one or more image parameters sets an exposure period for the third image, and wherein the one or more illumination control parameters set a flash period of the illumination component for the third image relative to the exposure period of the third image.

4. The method of claim 1, wherein the one or more illumination control parameters correspond to one of a flash timing parameter relative to an exposure of the third image, a flash duration parameter, a flash intensity parameter, a flash color temperature parameter, or a flash directionality parameter.

5. The method of claim 1, wherein determining the one or more illumination control parameters for the illumination component for the third image includes:
   determining the one or more illumination control parameters for the illumination component for the third image such that the third image satisfies an illumination criterion, wherein the third image satisfies the illumination criterion when a luminosity histogram of the third image indicates greater illuminance distribution compared to the delta luminosity histogram.

6. The method of claim 1, wherein generating the foreground estimation includes normalizing the first image and the second image based on camera settings.

7. The method of claim 1, wherein generating the foreground estimation includes aligning the first and second images.

8. The method of claim 1, wherein generating the foreground estimation includes removing a clipped portion that corresponds to the first image and not the second image.

9. The method of claim 1, wherein generating the foreground estimation includes blurring the first and second images according to predefined blur criteria.

10. The method of claim 1, wherein generating the foreground estimation of the scene includes generating the foreground estimation of the scene based at least in part on a selected focus area and the comparison of the second image and the first image.

11. The method of claim 1, wherein determining the one or more illumination control parameters for the third image of the scene that satisfy a foreground-background balance criterion based on the delta luminosity histogram includes determining the one or more illumination control parameters based on pixels within a portion of the delta luminosity histogram.

12. The method of claim 11, wherein determining the one or more illumination control parameters based on pixels within the portion of the delta luminosity histogram includes:
 determining a luminance gain value based on pixels within the portion of the delta luminosity histogram; and
 determining the one or more illumination control parameters based on the luminance gain value.

13. An electronic device comprising:
 an image sensor;
 an illumination component;
 a non-transitory memory;
 one or more processors; and
 one or more programs, wherein the one or more programs are stored in the non-transitory memory and configured to be executed by the one or more processors, the one or more programs including instructions for:
  obtaining, by the image sensor, a first image of a scene while the illumination component is set to an inactive state;
  obtaining, by the image sensor, a second image of the scene while the illumination component is set to a pre-flash state;
  generating a foreground estimation of the scene based on relative brightness differences of pixels of the first image and pixels of the second image;
  generating a delta luminosity histogram based on the foreground estimation;
  determining one or more illumination control parameters for the illumination component for a third image of the scene that satisfy a foreground-background balance criterion based on the delta luminosity histogram; and
  obtaining, by the image sensor, the third image of the scene while the illumination component is set to an active state in accordance with the one or more illumination control parameters.

14. The electronic device of claim 13, wherein the one or more illumination control parameters set a flash period of the illumination component for the third image relative to a predefined exposure period of the third image.

15. The electronic device of claim 13, wherein the one or more programs include instructions for determining one or more image parameters for the image sensor for the third image based on the foreground estimation in order to discriminate the foreground data from the background data within the scene, wherein one of the one or more image parameters sets an exposure period for the third image, and wherein the one or more illumination control parameters set a flash period of the illumination component for the third image relative to the exposure period of the third image.

16. The electronic device of claim 13, wherein the one or more illumination control parameters correspond to one of a flash timing parameter relative to an exposure of the third image, a flash duration parameter, a flash intensity parameter, a flash color temperature parameter, or a flash directionality parameter.

17. The electronic device of claim 13, wherein determining the one or more illumination control parameters for the illumination component for the third image includes:
 determining the one or more illumination control parameters for the illumination component for the third image such that the third image satisfies an illumination criterion, wherein the third image satisfies the illumination criterion when a luminosity histogram of the third image indicates greater illuminance distribution compared to the delta luminosity histogram.

18. The electronic device of claim 13, wherein determining the one or more illumination control parameters for the third image of the scene that satisfy a foreground-background balance criterion based on the delta luminosity histogram includes determining the one or more illumination control parameters based on pixels within a portion of the delta luminosity histogram.

19. The electronic device of claim 18, wherein determining the one or more illumination control parameters based on pixels within the portion of the delta luminosity histogram includes:
 determining a luminance gain value based on pixels within the portion of the delta luminosity histogram; and
 determining the one or more illumination control parameters based on the luminance gain value.

20. A non-transitory computer readable storage medium storing one or more programs, the one or more programs comprising instructions, which, when executed by one or more processors of an electronic device with an image sensor and an illumination component, cause the electronic device to:
 obtain, by the image sensor, a first image of a scene while the illumination component is set to an inactive state;
 obtain, by the image sensor, a second image of the scene while the illumination component is set to a pre-flash state;
 generate a foreground estimation of the scene based on relative brightness differences of pixels of the first image and pixels of the second image;
 generate a delta luminosity histogram based on the foreground estimation;
 determine one or more illumination control parameters for the illumination component for a third image of the scene that satisfy a foreground-background balance criterion based on the delta luminosity histogram; and
 obtain, by the image sensor, the third image of the scene while the illumination component is set to an active state in accordance with the one or more illumination control parameters.

* * * * *